US012647257B2

(12) United States Patent
Ren et al.

(10) Patent No.: US 12,647,257 B2
(45) Date of Patent: Jun. 2, 2026

(54) GENERATING POST-QUANTUM PRE-SHARED KEYS

(71) Applicant: Hewlett Packard Enterprise Development LP, Spring, TX (US)

(72) Inventors: Zhijun Ren, Beijing (CN); Chunfeng Wang, Beijing (CN); Yue Han, Beijing (CN)

(73) Assignee: Hewlett Packard Enterprise Development LP, Spring, TX (US)

(*) Notice: Subject to any disclaimer, the term of this patent is extended or adjusted under 35 U.S.C. 154(b) by 695 days.

(21) Appl. No.: 18/046,169

(22) Filed: Oct. 13, 2022

(65) Prior Publication Data

US 2024/0129115 A1 Apr. 18, 2024

(51) Int. Cl.
H04L 9/08 (2006.01)

(52) U.S. Cl.
CPC .......... H04L 9/0852 (2013.01); H04L 9/0866 (2013.01); H04L 9/0869 (2013.01)

(58) Field of Classification Search
CPC ... H04L 9/0852; H04L 9/0866; H04L 9/0869; H04L 9/0838; H04L 63/061; G06F 21/30
See application file for complete search history.

(56) References Cited

U.S. PATENT DOCUMENTS

| | | | |
|---|---|---|---|
| 2008/0095368 A1 | 4/2008 | Iida et al. | |
| 2021/0226782 A1* | 7/2021 | Florit | .................... H04L 9/0844 |
| 2021/0391984 A1* | 12/2021 | Florit | ..................... H04L 9/083 |
| 2022/0345300 A1* | 10/2022 | Inamdar | .............. H04L 63/0869 |
| 2023/0071333 A1* | 3/2023 | Inamdar | .............. H04L 63/0892 |
| 2023/0318818 A1* | 10/2023 | Sinha | .................. H04L 63/0272 |
| 2024/0298174 A1* | 9/2024 | Rajadurai | ............. H04W 12/06 |

FOREIGN PATENT DOCUMENTS

KR 10-0968523 B1 7/2010

OTHER PUBLICATIONS

El-Hajj et al., "Ethereum for Secure Authentication of IoT using Pre-Shared Keys (PSKs)", 2019, IEEE, 1570583880, 1-7 (Year: 2019).*
Dervisevic et al., "Overview of Quantum Key Distribution Technique Within IPSEC Architecture", Dec. 24, 2021, 13 pages.
Flurer et al., "Mixing Preshared Keys in the Internet Key Exchange Protocol Version 2 (IKEv2) for Post-quantum Security", IETF, Request for Comments: 8784, Jun. 2020, 16 pages.
Hakeem et al., "A Key Management Protocol Based on the Hash Chain Key Generation for Securing LoRaWAN Networks", MDPI, Aug. 30, 2021, 35 pages.
Kaufman et al., "Internet Key Exchange Protocol Version 2 (IKEv2)", IETF, Request For Comments 7296, Oct. 2014, 284 Pages.

* cited by examiner

*Primary Examiner* — Kambiz Zand
(74) *Attorney, Agent, or Firm* — Hewlett Packard Enterprise Patent Department

(57) ABSTRACT

In some examples, a first device sends a first request including first data generated by the first device to a second device, and the first device receives a first response including second data generated by the second device from the second device. The first device derives a post-quantum pre-shared key (PPK) based on the first data, the second data and a seed PPK, and sends a second request including an identification of the seed PPK to the second device to enable the second device to determine the derived PPK. The first device receives a second response including a confirmation to the second request from the second device.

18 Claims, 6 Drawing Sheets

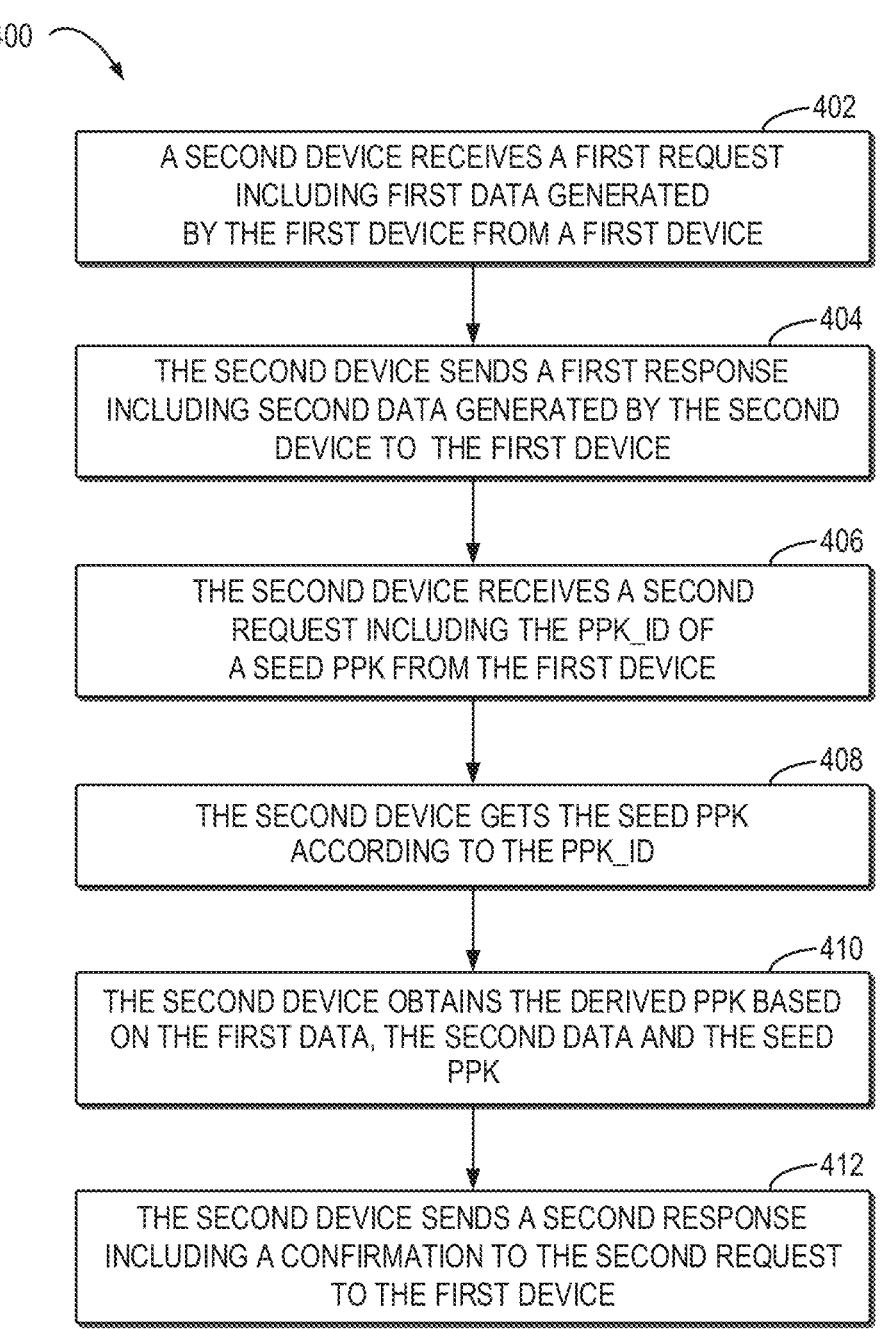

400

402
A SECOND DEVICE RECEIVES A FIRST REQUEST
INCLUDING FIRST DATA GENERATED
BY THE FIRST DEVICE FROM A FIRST DEVICE

404
THE SECOND DEVICE SENDS A FIRST RESPONSE
INCLUDING SECOND DATA GENERATED BY THE SECOND
DEVICE TO THE FIRST DEVICE

406
THE SECOND DEVICE RECEIVES A SECOND
REQUEST INCLUDING THE PPK_ID OF
A SEED PPK FROM THE FIRST DEVICE

408
THE SECOND DEVICE GETS THE SEED PPK
ACCORDING TO THE PPK_ID

410
THE SECOND DEVICE OBTAINS THE DERIVED PPK BASED
ON THE FIRST DATA, THE SECOND DATA AND THE SEED
PPK

412
THE SECOND DEVICE SENDS A SECOND RESPONSE
INCLUDING A CONFIRMATION TO THE SECOND REQUEST
TO THE FIRST DEVICE

*FIG. 4*

GENERATING POST-QUANTUM PRE-SHARED KEYS

BACKGROUND

A pre-shared key (PSK) is a shared secret that was previously shared between two parties and may be used as an authentication key during the encryption. The PSK may be used to authenticate each other before using other authentication methods such as user names and passwords.

With the development of quantum computing, it is possible to resolve Diffie-Hellman (DH) and Elliptic Curve Diffie-Hellman (ECDH) problems in polynomial time. Some current cryptosystems which are widely used, such as Internet Key Exchange Protocol Version 2 (IKEv2), may not be secure enough. The possibility of quantum computing becomes a challenge to cryptographic algorithms that are widely deployed.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures:

FIG. 4 illustrates a flow chart of another example method for generating a PPK according to implementations of the present disclosure;

DETAILED DESCRIPTION

Figure 1:
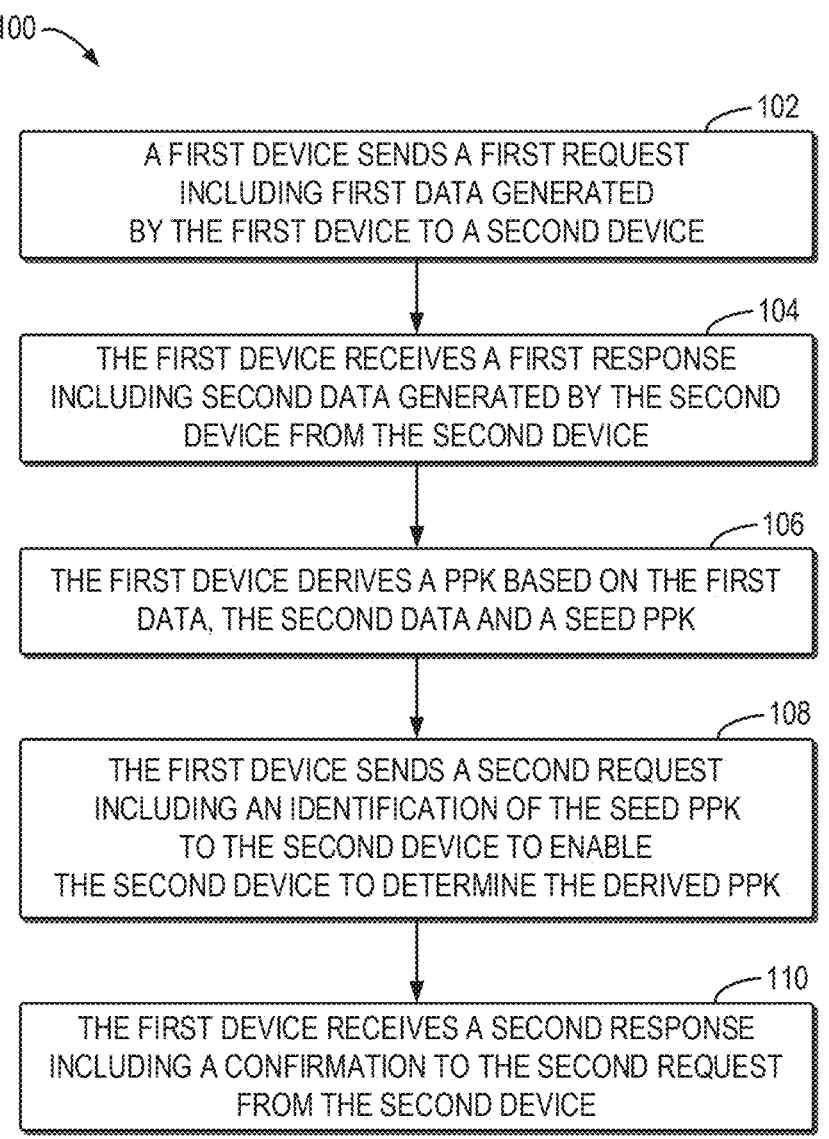
FIG. 1 illustrates a flow chart of an example method for generating a post-quantum pre-shared key (PPK) according to implementations of the present disclosure.

As discussed above, the possibility of quantum computers brings about a serious challenge to IKEv2. A PPK (also referred to as a quantum-resistant pre-shared key) may be introduced to IKEv2 to resist incoming attacks from quantum computers. However, configuring PPKs on large scale becomes a big challenge.

Generally, to leverage PPK to protect IKEv2 from attacks coming from quantum computers, an administrator uses an administrator device to configure a unique PPK for each IKEv2 peer to achieve higher security, rather than configuring a group PPK for all IKEv2 peers. However, manually configuring PPK for each peer is less efficient, although it works well on a small scale that just has a few IKEv2 peers. As the number of IKEv2 peers increases, it becomes a big challenge for the administrator device to configure PPKs for the IKEv2 peers.

For example, there is an example environment for configuring PPKs for peers, and the example environment may comprise multiple devices and an administrator device with a configuration function. The devices may be key-exchange-supported devices, such as personal computers, laptops, access points (APs), or routers. The administrator device may be a laptop, desktop computer, a server, and so on. The administrator device may configure a PPK for each peer of devices, and generates one PPK for per link of one peer and sends the PPK to each peer separately. As a result, if there are N peers, the administrator device would generate N PPKs for the N peers and take 2N times to send PPKs in total. In this way, as the cluster of devices increases, the administrator device would configure different PPKs for different peers and ensures that each peer has the same PPK. As such, it is tedious work for the administrator to finish PPK configuration for thousands of peers. Furthermore, each peer uses the same PPK for at least one session, and if the PPK is intercepted and decrypted, it is not secure anymore for the subsequent sessions. If each peer uses a different PPK in a different session, it would add more workloads to the administrator.

To address the problems mentioned above, implementations of the present disclosure propose a scheme to efficiently generate PPKs for peers, and derive PPKs for peers from one or more seed PPKs that are shared by peers. The one or more seed PPKs are not directly used by peers; instead, they are used to derive new PPKs, i.e., derived PPKs. When a peer establishes a session each time, it will generate the derived PPK according to the seed PPK through key negotiation. Then, the derived PPK is used by the peer for key material calculation. It is to be understood that the present disclosure is not limited to the IKEv2 protocol, and is also applicable to other key exchange protocols.

According to implementations of the present disclosure, one device sends a request including first data generated by this device to another device, and receives a response including second data generated by another device. Then, the two devices can derive the same PPK based on the first data, the second data and a seed PPK. In this way, implementations of the present disclosure can improve the efficiency of the PPK configuration and release the administrator from tedious manual work.

The administrator device may distribute the seed PPK(s) to each IKEv2 peer, and the derived PPK(s) may be generated by the IKEv2 peer based on the seed PPK(s). Thus, the present disclosure can improve the efficiency of the PPK configuration and reduce the manual work for the administrator. Furthermore, the different derived PPKs are always used for each IKEv2 peer at different communications, and it is difficult to reversely derive the seed PPK(s) from the intercepted derived keys. Therefore, the present disclosure can improve security efficiently for the IKEv2 peers, and is resistant to quantum computing.

Other advantages of implementations of the present disclosure will be described with reference to the example implementation as described below. Reference is made below to FIG. 1 through FIG. 6 to illustrate basic principles and several example implementations of the present disclosure herein.

FIG. 1 illustrates a flow chart of an example method 100 for generating a PPK for an IKEv2 peer according to implementations of the present disclosure. The method 100 may be performed by various devices, such as a first device in one peer. The first device may be a laptop, a desktop computer, an AP, a switch, a router, a mobile phone, or other key-exchange enabled device, and so on.

At 102, a first device sends a first request including first data generated by the first device to a second device. As used herein, the first device (also referred to as an initiator) and the second device (also referred to as a responder) may be one peer that has the capability to perform internet key exchange. In some example implementations, the first device and the second device may use the IKEv2 for key negotiation, which may be called an IKEv2 peer.

At 104, the first device receives a first response including second data generated by the second device from the second device. In some example implementations, the first request and the first response may be the IKE_SA_INIT exchange messages according to IKEv2.

In some example implementations, the first data may be included in a vendor payload of the first device, and the second data may be included in a vendor payload of the second device. For example, the IKE_SA_INIT message may carry a new vendor payload Vi for PPK derivation. The payload Vi may be the identification of the initiator, such as a media access control (MAC) address, an internet protocol (IP) address, a serial number of the initiator, and so on. In some example implementations, to add randomness for the derived PPK, the vendor payload Vi may include one or more random numbers or one or more time stamps, and thus different derived PPKs may be generated in each IKEv2 negotiation even for the same IKEv2 peer. Similar to the initiator, the responder also may carry a specific vendor payload Vr for PPK derivation.

In some example implementations, the first data may comprise at least one of: a MAC address of the first device, a serial number of the first device, an IP address of the first device, one or more random numbers generated by the first device, or one or more time stamps generated by the first device. In some example implementations, the second data may comprise at least one of: a MAC address of the second device, a serial number of the second device, an IP address of the second device, one or more random numbers generated by the second device, or one or more time stamps generated by the second device. For example, when the initiator sends the IKE_SA_INIT request to the responder, the Vi of the IKE_SA_INIT request may carry a time stamp of the sending time, such as "2022-07-12 09:40:25". After the responder receives the IKE_SA_INIT request from the initiator, the responder sends the IKE_SA_INIT response to the initiator, the Vr of the IKE_SA_INIT response may carry a time stamp of the sending time, such as "2022-07-12 09:41:32".

At 106, the first device derives a PPK based on the first data, the second data, and a seed PPK. In some example implementations, the derived PPK is used for key material calculation related to the IKEv2. For example, after the IKE_SA_INIT exchange is done, the initiator starts calculating the derived PPK according to the configured seed PPK and Vi, Vr included in the vendor payloads as described above. Then, the key materials may be calculated based on the derived PPK, and the whole key may be decrypted according to the derived PPK with other key parts. Derivation function may be pseudo random function (PRF) negotiated in the IKE_SA_INIT or SHA2 algorithm family or self-defined private function, and so on. The derivation function has a certain level of security. For example, a PRF may use the seed PPK as input so as to output the derived PPK, which is random. Without knowing the encrypted key, it is difficult to distinguish the output value of the PRF from the true random value. The PRF model has security properties, such as output indistinguishability, output unidirectionality and so on. So even if a derived PPK is compromised by accident, the seed PPK and other derived PPKs derived from the same seed PPK are still secure.

In some example implementations, the one or more seed PPKs are not directly used by peers; instead, they are used to derive new PPKs. The new PPKs are for example called derived PPKs. When a peer establishes a session each time, it will generate the derived PPK according to the seed PPK through key negotiation. Then, the derived PPK is used by the peer for key material calculation. Since different derived PPKs are used for one peer at different sessions, if one message in the communication is intercepted, the derived PPK for the message may be obtained by the attacker, rather than the seed PPK. If the seed PPK is used directly in one or more sessions by peers, other sessions based on the seed PPK are no longer secure because the seed PPK has been cracked through one session. Therefore, the present disclosure can improve security efficiently for peers, which is resistant to quantum computing.

At 108, the first device sends a second request including an identification of the seed PPK to the second device to enable the second device to determine the derived PPK. In some example implementations, the first device may select a seed PPK from one or more seed PPKs in a mapping table and send the identification (such as a PPK_ID) of the selected seed PPK to the second device. For example, the PPK_ID may be carried in the IKE_AUTH message, and the PPK_ID may be transmitted along with the IKE_AUTH request. The second request carries the PPK_ID of the seed PPK rather than the seed PPK itself, and it would improve security.

At 110, the first device receives a second response including a confirmation to the second request from the second device. In some example implementations, the second request and the second response may be the IKE_AUTH exchange messages according to the IKEv2. It is to be understood that the blocks 102, 104, 106, 108, and 110 of the method 100 are not limited as sequential. In some example implementations, the block 108 may be performed before the block 106.

Figure 2:
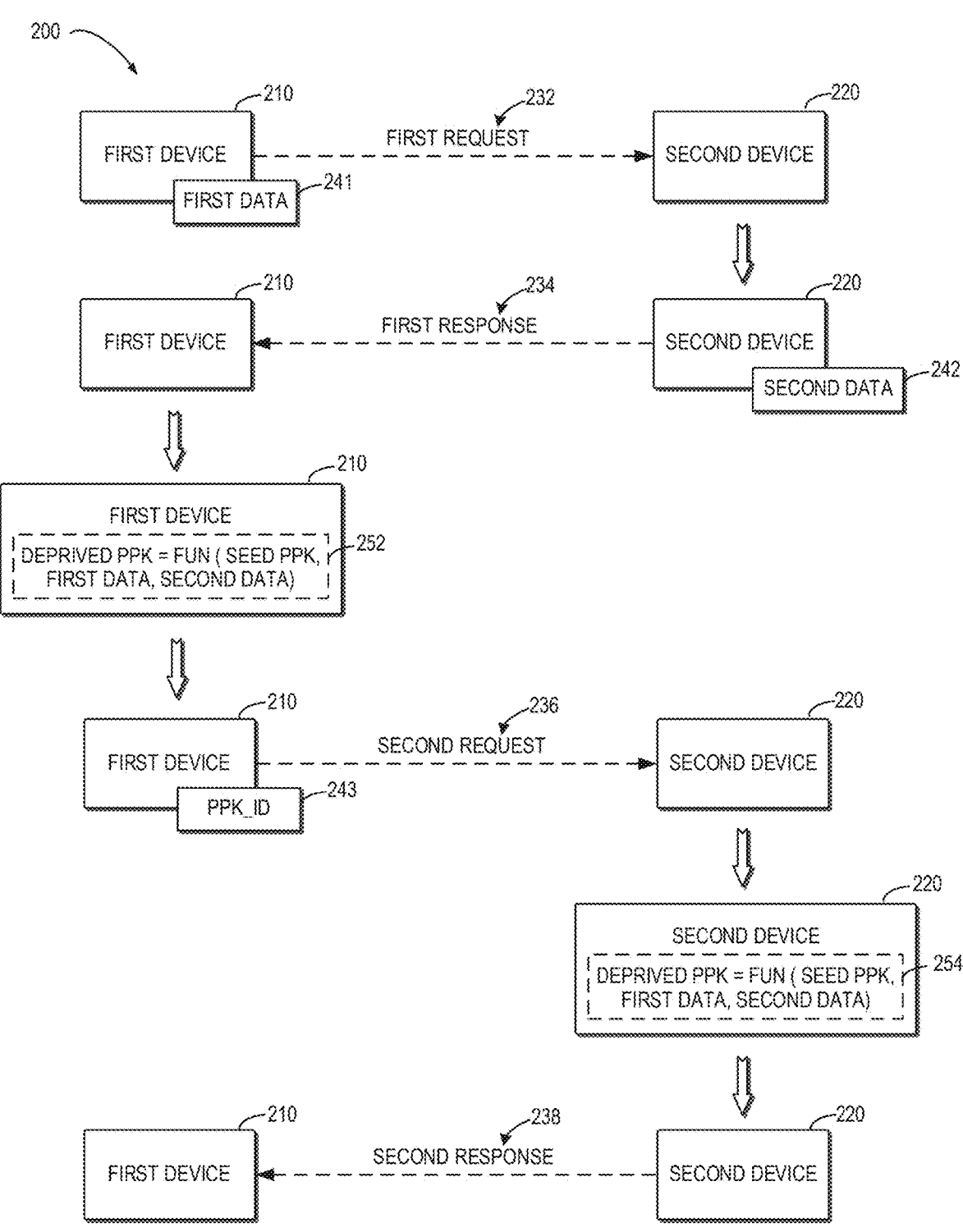
FIG. 2 illustrates an example data flow for configuring a PPK between two devices according to implementations of the present disclosure.

FIG. 2 illustrates an example data flow 200 for configuring a PPK between the first device and the second device. As shown in FIG. 2, the first device 210 may generate a first data 241, and send a first request 232 including the first data 241 to the second device 220. Then, the second device 220 may generate a second data 242, and send a first response 234 including the second data 242 to the first device 210 in response to the first request 232. The first device 210 may derive 252 a PPK based on the first data 241, the second data 242, and a selected seed PPK. In some implementations, the derived PPK may be used for subsequent key material calculations. Next, the first device 210 may send a second request 236 including the PPK_ID 243 corresponding to the selected seed PPK to the second device 220. The second device 220 may determine 254 the derived PPK based on the first data 241, the second data 242, and the seed PPK corresponding to the PPK_ID 243. Then, the second device 220 may send a second response 238 to the first device 210 in response to the second request 236.

In some implementations, the administrator device may configure one or more seed PPKs and the corresponding identifications (such as PPK_IDs) of the seed PPKs for peers, which may include a seed PPK_ID type. In some example implementations, the seed PPK_ID type field may be one octet, and its value ranges from 0~255. For example, value 0 may be reserved, values 1 and 2 may be defined, and values 128~255 may be reserved for private use. It may reserve a separate PPK_ID to indicate that the configured PPK is a seed PPK, which will not be directly used for key material calculation in the IKEv2 protocol.

In some implementations, the administrator device may configure a mapping table including the mappings between the seed PPKs and the seed PPK_IDs, and both the first device and the second device may receive the mapping table generated by the administrator device. For example, the mapping table including the mappings between the seed PPKs and the seed PPK_IDs may be stored on the devices.

Figure 3:
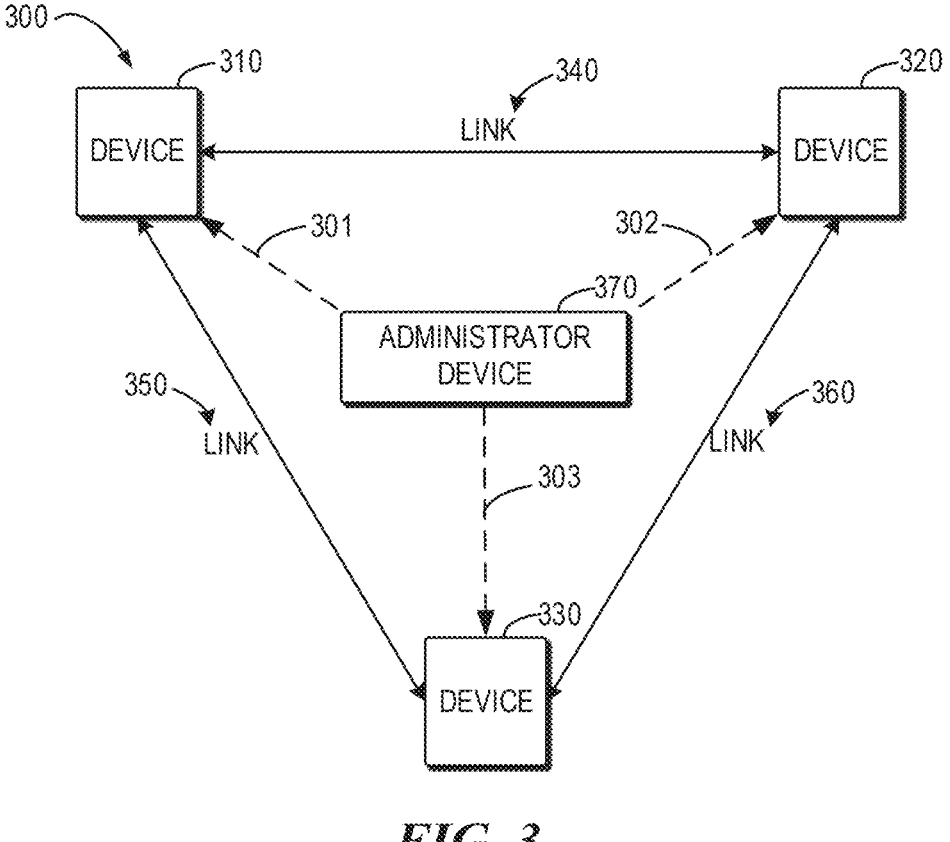
FIG. 3 illustrates an example environment for configuring PPKs among three devices according to implementations of the present disclosure.

FIG. 3 illustrates an example environment 300 for configuring PPKs among three devices according to implementations of the present disclosure. As indicated by 300 in FIG. 3, the environment 300 comprises devices 310, 320, 330 and an administrator device 370. The administrator device 370 may configure one or more seed PPKs for each peer. As shown in FIG. 3, a link 340 is established between the device 310 and the device 320, a link 350 is established between the device 310 and the device 330, and a link 360 is established between the device 320 and the device 330. The administrator device 370 may configure a mapping table including the mapping between the seed PPK(s) and the seed PPK_ID(s), and then the administrator device 370 may send the mapping table to the devices. For example, the administrator device 370 sends 301 the mapping table to device 310, sends 302 the mapping table to device 320, and sends 303 the mapping table to device 330. Then, the mapping table including a mapping between the seed PPK(s) and the seed PPK_ID(s) may be stored in the devices, such as device 310, 320, 330.

The one or more seed PPKs will be used by each peer to determine a derived PPK during the key negotiation process. Then, the derived PPK is used by the peer as a basis of key material calculation. For example, different derived PPKs are generated and used respectively in the link 340, the link 350, and the link 360. It can be seen that the administrator device 370 may configure a few seed PPKs and the mapping table to each peer, and the derived PPKs will be generated by the peers. Thus, the present disclosure can improve the efficiency of the PPK configuration and release the administrator device from tedious manual work.

FIG. 4 illustrates a flow chart of an example method 400 associated with the second device. At 402, a second device receives a first request including first data generated by the first device from a first device. At 404, the second device sends a first response including second data generated by the second device to the first device. In some example implementations, the first request and the first response may be the IKE_SA_INIT exchange messages according to IKEv2. The description of the first data and the second data may be referred above.

At 406, the second device receives a second request including the PPK_ID of a seed PPK from the first device. In some example implementations, the seed PPK may be selected by the first device. At 408, the second device gets the seed PPK according to PPK_ID received from the first device based on the mapping table. In some implementations, the second device stores the mapping table including mappings between the seed PPKs and the seed PPK_IDs. In some implementations, the second device may get the configured seed PPK according to the received PPK_ID by querying the mapping table. At 410, the second device obtains the derived PPK based on the first data, the second data, and the seed PPK. After obtaining the seed PPK, the second device may perform the same derivation function as negotiated so as to obtain the same derived PPK for the following key material calculation. For example, the first device and the second device have negotiated to use the PRF to derive PPK in previous message. The second device will use the PRF to obtain the derived PPK, and the first data, the second data and the seed PPK are used as the input of the PRF.

At 412, the second device sends a second response including a confirmation to the second request to the first device. In some example implementations, the second request and the second response may be the IKE_AUTH exchange messages according to the IKEv2. It is to be understood that the blocks 402, 404, 406, 408, 410 and 412 of the method 400 are not limited as sequential. In some example implementations, the block 412 may be performed before the block 408 and/or the block 410.

According to implementations of the present disclosure, a scheme for efficiently generating the derived PPKs for peers can be achieved by using the seed PPKs. The administrator device may distribute the seed PPK to each device, and the derived PPKs can be generated by the peers based on the seed PPK. In some implementations, by taking random numbers or timestamps as part of the vendor payloads used for PPK derivation, different PPKs will result in different key exchange negotiation instances even for the same peer. Thus, it is difficult to reversely derive the seed PPK(s) from the intercepted derived keys. Accordingly, the present disclosure can provide higher security, because each derived PPK is used once even for the same peer.

As used herein, the IKEv2 is a component of IP security (IPsec) used for performing mutual authentication and establishing and maintaining security associations (SAs). IPsec provides confidentiality, data integrity, access control, and data source authentication to IP datagrams. These services are provided by maintaining a shared state between the source and the sink of an IP datagram. This state defines, among other things, the specific services provided to the datagram, which cryptographic algorithms will be used to provide the services, and the keys used as input to the cryptographic algorithms.

The IKEv2 communications include pairs of messages: a request and a response. This pair is called an "exchange." The messages establishing an IKE_SA are called IKE_SA_INIT and IKE_AUTH exchanges and subsequent IKEv2 exchanges are called CREATE_CHILD_SA or informational exchanges. In the common case, there is a single IKE_SA_INIT exchange and a single IKE_AUTH exchange (a total of four messages) to establish the IKE_SA and the first CHILD_SA. In exceptional cases, there may be more than one of each of these exchanges. In some cases, all IKE_SA_INIT exchanges will complete before any other exchange type, then all IKE_AUTH exchanges will complete, and following that any number of CREATE_CHILD_SA and informational exchanges may occur in any order. The IKEv2 message flow includes a request followed by a response. It is the responsibility of the requester to ensure reliability. If the response is not received within a timeout interval, the requester needs to retransmit the request or abandon the connection.

Communications using IKEv2 begin with IKE_SA_INIT and IKE_AUTH exchanges which can be called the initial exchanges. These initial exchanges normally comprise four messages, though in some scenarios that number can grow. All communications using IKEv2 include request/response pairs. The first pair of messages (i.e., IKE_SA_INIT) negotiate cryptographic algorithms, exchange nonces, and do a Diffie-Hellman (DH) exchange. The second pair of messages (i.e., IKE_AUTH) authenticate the previous messages, exchange identities, and certificates, and establish the first CHILD_SA. Parts of these messages are encrypted and integrity protected with keys established through the IKE_SA_INIT exchange, so the identities are hidden from eavesdroppers and all fields in all the messages are authenticated.

Figure 5:
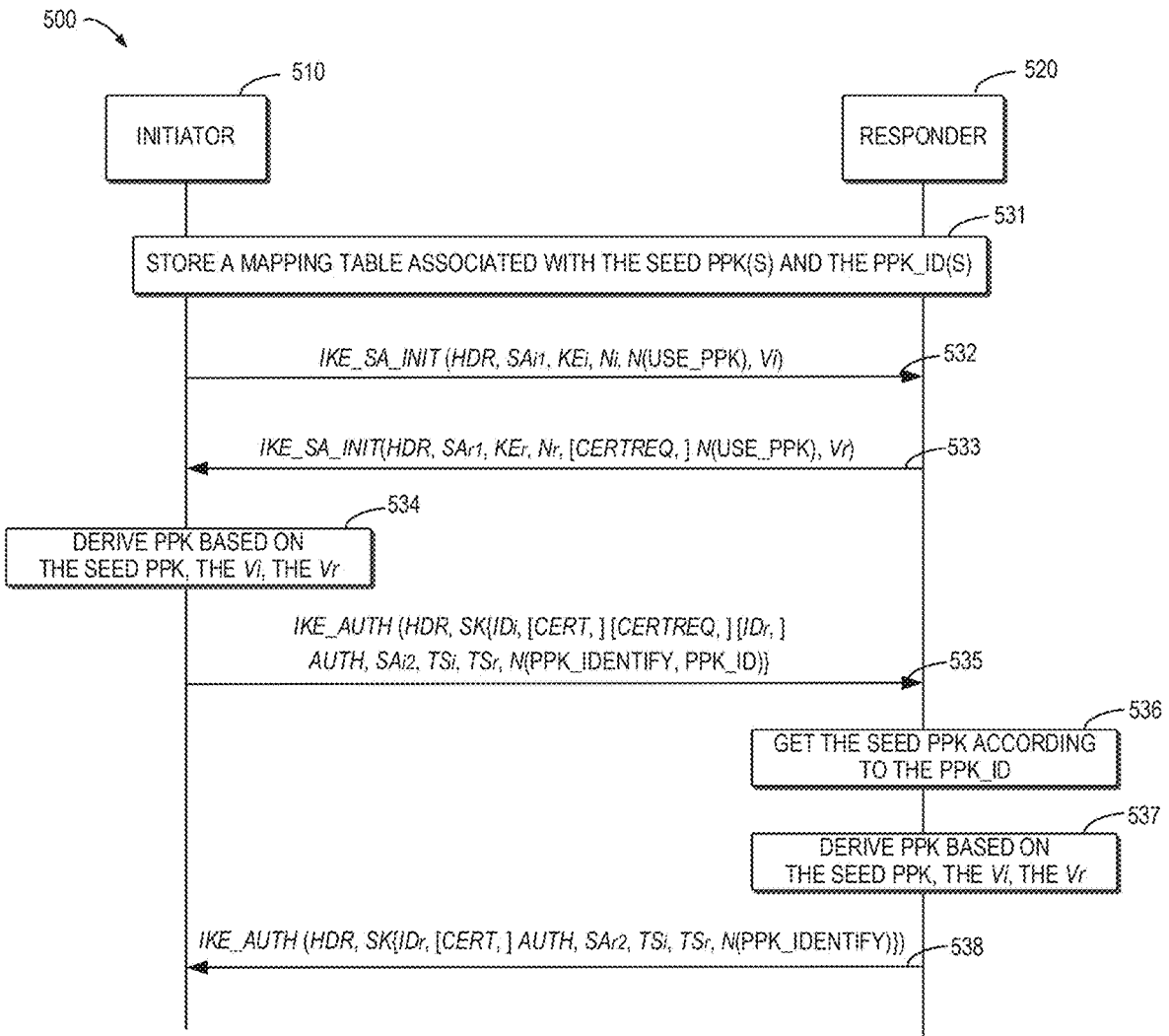
FIG. 5 illustrates an example process for generating a PPK for an IKEv2 peer according to implementations of the present disclosure.

FIG. 5 illustrates an example process 500 for generating a PPK for an IKEv2 peer (such as initiator 510 and responder 520) according to implementations of the present disclosure. As shown in FIG. 5, at 531, a mapping table associated with seed PPKs and PPK_IDs is stored in initiator 510 and responder 520. For example, the initiator 510 (as an example of the first device) and the responder 520 (as an example of the second device) may be an IKEv2 peer that has the capability to use the IKEv2 for key negotiation and perform internet key exchange.

In some example implementations, the administrator device may configure a seed PPK and the corresponding identification (such PPK_ID) of the seed PPK for each peer, which may include a PPK_ID type. In some example implementations, the seed PPK_ID type field may be one octet in IKEv2. A separate PPK_ID may be reserved to indicate that the configured PPK is a seed PPK, which should not be directly used for key material calculation in the IKEv2 protocol.

In some example implementations, the administrator device may configure a mapping table including the mapping between the seed PPK(s) and the seed PPK_ID(s), and the initiator 510 and/or the responder 520 may receive the mapping table generated by the administrator device. Then, the mapping table including the mappings between the seed PPKs and the seed PPK_IDs may be stored in the initiator 510 and/or the responder 520.

In some cases, at 532 and 533, the first exchange (also referred to as IKE_SA_INIT exchange) is performed. The IKE_SA parameter negotiation may be completed in plaintext mode, including negotiation of encryption and authentication algorithms, exchange of temporary random numbers and DH exchange. A shared key material may be generated after the IKE_SA_INIT exchange. All IPsec SA keys may be derived from this shared key material. The 535 and 538 messages are called the second exchange (also referred to as IKE_AUTH exchange), which complete identification authentication, authentication of the 532 and 533 messages, and IPsec SA parameter negotiation in the encrypted mode. The IKEv2 supports RSA signature authentication, preshared key authentication, and extensible authentication protocol (EAP).

At 532, The IKE_SA_INIT request including Vi may be sent from the initiator 510 to the responder 520. For example, the IKE_SA_INIT request sent by the initiator 510 may include some fields such as HDR, $SA_{i1}$, $KE_i$, $N_i$, N(USE_PPK), and Vi. In some cases, HDR indicates IKE Header, $SA_{i1}$ indicates the security association of the initiator 510, $KE_i$ indicates the key exchange of the initiator 510, and $N_i$ indicates the nonce of the initiator 510. In some implementations, HDR may contain security parameter indexes (SPIs), version numbers, and flags of various sorts. The $SA_{i1}$ payload states the cryptographic algorithms that the initiator 510 supports for the IKE_SA. The $KE_i$ payload sends the initiator's Diffie-Hellman value. $N_i$ is the initiator's nonce. The N(USE_PPK) included in the IKE_SA_INIT request is a status notification payload that indicates the initiator 510 is configured to use a PPK with the responder 520. In some example implementations, the Vi may be generated by the initiator 510. For example, the IKE_SA_INIT may carry a new vendor payload Vi for PPK derivation. The Vi may be the initiator's identification, such as the MAC address, the IP address, the serial number of the initiator, and so on. To add randomness for the derived PPKs, the vendor payload Vi may include one or more random numbers or one or more time stamps generated by the initiator 510, so different derived PPKs may be generated in each IKEv2 negotiation even for the same IKEv2 peer.

At 533, the IKE_SA_INIT response including Vr may be sent from the responder 520 to the initiator 510. In response to the IKE_SA_INIT request sent by the initiator 510 at 532, the responder 520 sends the IKE_SA_INIT response for confirmation, which may include some fields such as HDR, $SA_{r1}$, $KE_r$, $N_r$, [CERTREQ,]N(USE_PPK), and Vr. In some cases, HDR indicates IKE Header, $SA_{r1}$ indicates security association of the responder 520, $KE_r$ indicates key exchange of the responder 520, $N_r$ indicates nonce of the responder 520, and [CERTREQ,] indicates certificate request. Payloads that may optionally appear will be shown in brackets, such as [CERTREQ], which indicates that a certificate request payload may be included. In some implementations, the responder 520 may choose a cryptographic suite from the initiator's offered choices and expresses that choice in the $SA_{r1}$ payload, completes the Diffie-Hellman exchange with the $KE_r$ payload, and sends its nonce in the $N_r$ payload. If the responder 520 supports PPK configuration, the responder 520 may reply with the IKE_SA_INIT response message including a USE_PPK notification.

In some example implementations, the Vr may be generated by the responder 520. Similar to the initiator 510, the IKE_SA_INIT also may carry a specific vendor payload Vr for PPK derivation. The Vr may be the responder's identification, such as the MAC address, the IP address, the serial number of the responder, and so on. To add randomness for the derived PPKs, the vendor payload Vr may include one or more random numbers or one or more time stamps generated by the responder 520, so different derived PPKs may be generated in each IKEv2 negotiation even for the same IKEv2 peer.

During the negotiation, each party may generate SKEYSEED, from which all keys are derived for that IKE_SA. The headers of the following messages may be encrypted and integrity protected. The keys used for the encryption and integrity protection are derived from SKEYSEED and are known as SK_e (encryption) and SK_a (authentication, a.k.a. integrity protection). A separate SK_e and SK_a are computed for each direction. In addition to the keys, SK_e and SK_a, derived from the DH value for the protection of the IKE_SA, another quantity SK d is derived and used for derivation of further keying material for CHILD SAs. The notation SK { . . . } indicates that these payloads are encrypted and integrity protected using that direction's SK_e and SK_a.

At 534, the initiator 510 may derive a PPK based on the seed PPK, the Vi, and the Vr. For example, after the IKE_SA_INIT exchange is done, the initiator 510 starts calculating the derived PPK according to the configured seed PPK and Vi, Vr carried in the IKE_SA_INIT mentioned above. Then, the key materials may be calculated based on the derived PPK, and the whole key may be decrypted according to the derived PPK with other key parts. Derivation function may be PRF negotiated in the IKE_SA_INIT or SHA2 algorithm or self-defined private function, and so on. The derivation function has a certain level of security, so even if a derived PPK is compromised by accident, the seed PPK and other derived PPKs derived from the same seed PPK are still secure.

At 535, the IKE_AUTH including a PPK_ID may be sent from the initiator 510 to the responder 520. In some example implementations, the initiator 510 may select a seed PPK from one or more seed PPKs in the mapping table and send the PPK_ID corresponding to the selected seed PPK to the responder 520. For example, the PPK_ID may be carried in the IKE_AUTH message, and the PPK_ID may be transmitted along with the IKE_AUTH request. For example, the IKE_AUTH request sent by the initiator 510 may include some fields, such as HDR, SK{ID$_i$, [CERT,][CERTREQ,] [ID$_r$,]AUTH, SA$_{i2}$, TS$_i$, TS$_r$, and N(PPK_IDENTIFY, PPK_ID)}. In some cases, HDR indicates IKE Header, ID$_i$ indicates the identification of the initiator 510, ID, indicates the identification of the responder 520, [CERT,] indicates certificate, [CERTREQ,] indicates certificate request, AUTH indicates authentication, SA$_{i2}$ indicates security association of the initiator 510, TS$_i$ indicates traffic selector of the initiator 510, and TS$_r$ indicates traffic selector of the responder 520. The PPK_IDENTITY is a status notification that indicates whether a PPK is used in the exchange, and it carries notification data that consists of the identifier PPK_ID.

In some example implementations, the initiator 510 asserts its identification with the ID, payload, proves knowledge of the secret corresponding to ID$_i$, and protects the contents of the first message using the AUTH payload. It may also send its certificate(s) in CERT payload(s) and a list of its trust anchors in CERTREQ payload(s). If any CERT payloads are included, the first certificate provided shall contain the public key used to verify the AUTH field. The optional payload ID, enables the initiator 510 to specify which of the responder's identities it wants to talk to. This is useful when the machine on which the responder 520 is running is hosting multiple identities at the same IP address. The initiator 510 begins negotiation of a CHILD_SA using the SA$_{i2}$ payload. The final fields (starting with SA$_{i2}$) are described in the description of the CREATE_CHILD_SA exchange.

At 536, the responder 520 may get the seed PPK according to the PPK_ID. For example, after receiving the PPK_ID, the responder 520 may get the configured seed PPK according to the mapping table. For example, the responder 520 receives the PPK_ID "1" and it may obtain the seed PPK "wd3i7px65ytg" by querying the mapping table.

At 537, the responder 520 may derive the PPK based on the seed PPK, the Vi, and the Vr. For example, the responder 520 may perform the same derivation function as negotiated with the initiator 510 so as to obtain the same derived PPK for the following key material calculation.

At 538, the IKE_AUTH may be sent from the responder 520 to the initiator 510. In response to the IKE_AUTH request sent by the initiator 510 at 535, the responder 520 sends the IKE_AUTH response for confirmation, which can include some fields such as HDR, SK{ID$_r$, [CERT,]AUTH, SA$_{r2}$, TS$_i$, TS$_r$, N(PPK_IDENTIFY)}. In some cases, HDR indicates IKE Header, ID, indicates the identification of the responder 520, [CERT,] indicates certificate, AUTH indicates authentication, SA$_{r2}$ indicates security association of the responder 520, TS$_i$ indicates traffic selector of the initiator 510, and TS$_r$ indicates traffic selector of the responder 520. In some example implementations, the responder 520 asserts its identification with the ID, payload, optionally sends one or more certificates (again with the certificate containing the public key used to verify AUTH listed first), authenticates its identification and protects the integrity of the second message with the AUTH payload, and completes negotiation of a CHILD_SA with the additional fields described below in the CREATE_CHILD_SA exchange. The recipients of the messages will verify that all signatures and MACs are computed correctly and that the names in the ID payloads correspond to the keys used to generate the AUTH payload.

The responder 520 sends back a response with the IKE_AUTH exchange, which includes the PPK_IDENTITY notification with no data to indicate that the PPK is used in the exchange. In some cases, if no PPK_IDENTITY notification is found and the peers successfully exchanged USE_PPK notifications in the IKE_SA_INIT exchange, then the responder 520 may send back an AUTHENTICATION-_FAILED notification to the initiator 510 and then fail the negotiation. In some cases, if the PPK_IDENTITY notification contains a PPK_ID that is not known to the responder 520 or is not configured for use for the identity from the ID, payload, then the responder 520 checks whether using PPKs for this initiator 510 is mandatory and whether the initiator 510 included a NO_PPK_AUTH notification in the message. If using PPKs is mandatory or no NO_PPK_AUTH notification is found, then the responder 520 may send back an AUTHENTICATION_FAILED notification and then fail the negotiation. When a PPK is optional and the initiator 510 included a NO_PPK_AUTH notification, the responder 520 may continue the regular IKEv2 protocol, except that it uses the data from the NO_PPK_AUTH notification as the authentication data (which usually resides in the AUTH payload) for the purpose of the initiator 510 authentication. It is to be understood that the authentication method is still indicated in the AUTH payload.

It is to be understood that the blocks 532-538 in the example process 500 are not limited as sequential. In some example implementations, the block 535 may be performed before the block 534, and/or the block 538 may be performed before the block 536. More implementations of the present disclosure may be combined with the reference to one or more implementations as described above in FIGS. 1-4.

According to the example process 500 of the present disclosure, a scheme for efficiently generating derived PPKs for IKEv2 peers can be achieved by using the seed PPK(s). The administrator device may distribute the seed PPK to each IKEv2 peer, and the derived PPKs can be generated by the IKEv2 peers. In addition, by taking random numbers or time stamps as part of the vendor payloads used for PPK derivation, different PPKs will result in different IKEv2 negotiation instances even for the same IKEv2 peer.

Figure 6:
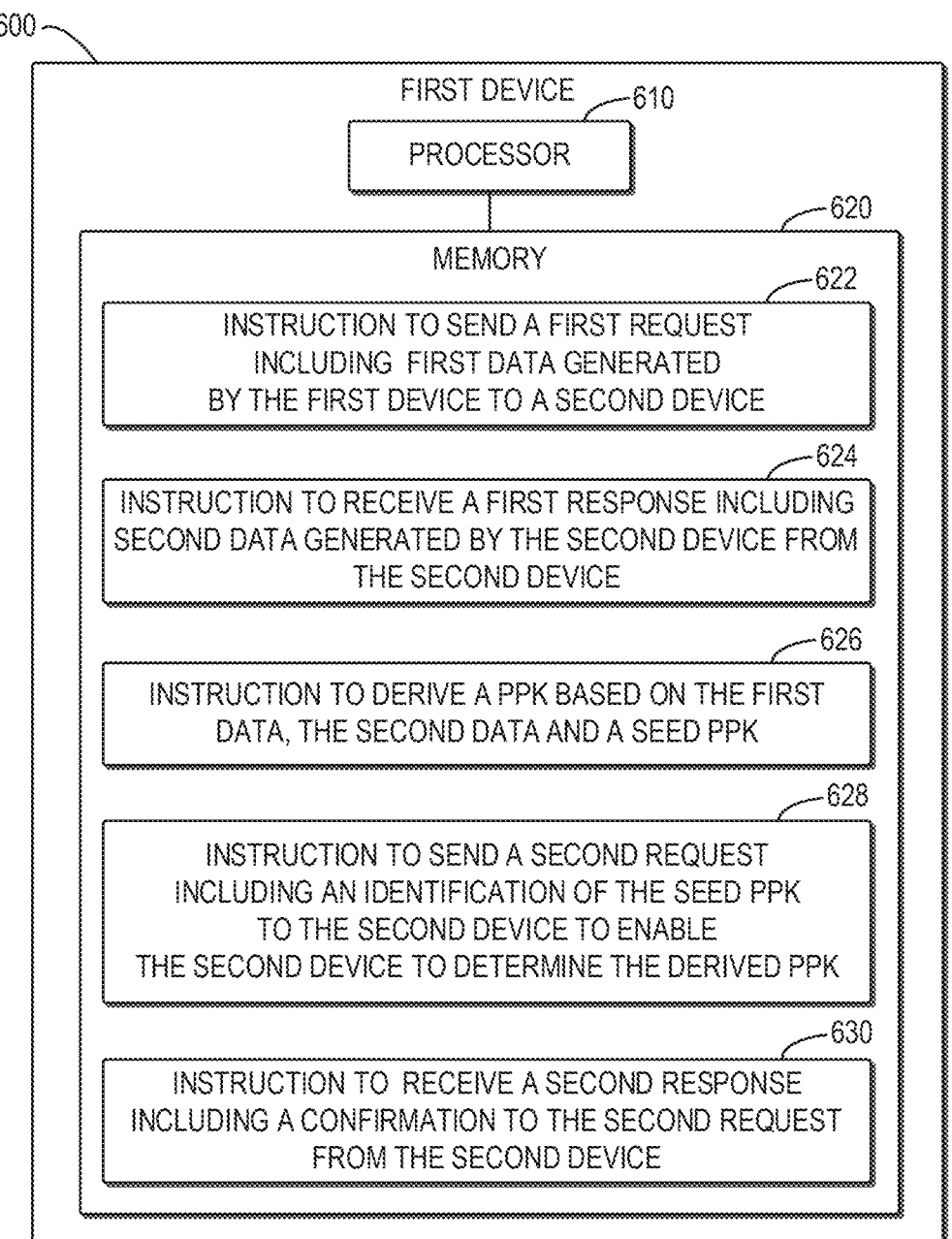
FIG. 6 illustrates an example device according to implementations of the present disclosure.

FIG. 6 illustrates an example first device 600 (which may be the first device 210 or the initiator 510) according to implementations of the present disclosure. As shown in FIG. 6, the first device 600 comprises a processor 610 and a memory 620 coupled to the processor 610. The memory 620 stores instructions 622, 624, 626, 628, and 630 to cause the processor 610 to perform actions according to implementations of the present disclosure.

As shown in FIG. 6, the memory 620 stores instruction 622 to send a first request including first data generated by the first device to a second device, and instruction 624 to receive a first response including second data generated by the second device from the second device. As shown in FIG. 6, the memory 620 further stores instruction 626 to derive a PPK based on the first data, the second data, and a seed PPK. The memory 620 further stores instruction 628 to send a second request including an identification of the seed PPK to the second device to enable the second device to determine the derived PPK, and instruction 630 to receive a second response including confirmation to the second request from the second device.

In some example implementations, wherein the first request in the instruction 622 and the first response in the instruction 624 may be the IKE_SA_INIT exchange messages according to IKEv2, and the second request in the instruction 628 and the second response in the instruction 630 are the IKE_AUTH exchange messages according to the IKEv2.

In some example implementations, wherein the first data in the instructions 622 and 626 comprises at least one of: a MAC address of the first device, a serial number of the first device, an IP address of the first device, one or more random numbers generated by the first device, or one or more time stamps generated by the device. The second data in the instructions 624 and 626 comprises at least one of: a MAC address of the second device, a serial number of the second device, an IP address of the second device, one or more random numbers generated by the second device, and one or more time stamps generated by the second device. In some example implementations, wherein the first data is included in a vendor payload of the device, and the second data is included in a vendor payload of the second device.

In some example implementations, wherein a mapping table including a mapping between the seed PPK and the identification of the seed PPK is stored in the memory 620. In some example implementations, the memory 620 further stores instructions to receive the mapping table from an administrator device. In some example implementations, the memory 620 further stores instructions to select the seed PPK from multiple seed PPKs in the mapping table. In some example implementations, wherein the identification of the seed PPK indicates that the seed PPK is not directly used for key material calculation related to the IKEv2. In some example implementations, wherein the derived PPK is used for key material calculation related to the IKEv2, rather than the seed PPK.

In some example implementations, there is disclosure a non-transitory computer-readable medium. The non-transitory computer-readable medium comprises instructions stored thereon, when executed by a first device, cause the first device to send a first request including first data generated by the first device to a second device, wherein the first data comprises at least one of: a MAC address of the first device, a serial number of the first device, an IP address of the first device, one or more random numbers generated by the first device, or one or more time stamps generated by the first device. The instructions further cause the first device to receive a first response including second data generated by the second device from the second device, wherein the second data comprises at least one of: a MAC address of the second device, a serial number of the second device, an IP address of the second device, one or more random numbers generated by the second device, or one or more time stamps generated by the second device, and the first request and the first response may be the IKE_SA_INIT exchange messages according to IKEv2. The instructions further cause the first device to derive a PPK based on the first data, the second data and a seed PPK, and send a second request including an identification of the seed PPK to the second device to enable the second device to determine the derived PPK. The instructions further cause the first device to receive a second response including confirmation to the second request from the second device, wherein the second request and the second response may be the IKE_AUTH exchange messages according to the IKEv2.

Implementations of the present disclosure may be further combined with the reference to one or more implementations as described above in FIGS. 1-6.

Program codes or instructions for carrying out methods of the present disclosure may be written in any combination of one or more programming languages. These program codes or instructions may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine or entirely on the remote machine or server.

In the context of this disclosure, a machine-readable medium may be any tangible medium that may contain, or store a program for use by or in connection with an instruction execution system, apparatus, or device. The machine-readable medium may be a machine-readable signal medium or a machine-readable storage medium. A machine-readable medium may include but not be limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed:

1. A method comprising:

selecting, by a first device, a first seed post-quantum pre-shared key (PPK) from among a plurality of seed PPKs in mapping information stored in a memory of the first device, the mapping information correlating seed PPK identifiers to the plurality of seed PPKs;

sending, by the first device to a second device, a first request including first data generated by the first device;

receiving, by the first device from the second device, a first response including second data generated by the second device;

deriving, by the first device, a PPK based on the first data, the second data and the first seed PPK;

sending, by the first device to the second device, a second request including a first seed PPK identifier of the first seed PPK to enable the second device to determine the derived PPK, the first seed PPK identifier included in the mapping information;

receiving, by the first device from the second device, a second response including a confirmation of the second request, the confirmation sent by the second device after the second device has generated the derived PPK using the first seed PPK retrieved based on the first seed PPK identifier from mapping information stored at the second device; and using, by the first device, the derived PPK in an authentication of the first device.

2. The method according to claim 1, wherein the first request and the first response are IKE_SA_INIT exchange messages according to an internet key exchange version 2 (IKEv2) protocol, and the second request and the second response are IKE_AUTH exchange messages according to the IKEv2 protocol.

3. The method according to claim 1, wherein;

the first data comprises at least one of: a media access control (MAC) address of the first device, a serial number of the first device, an internet protocol (IP) address of the first device, one or more random numbers generated by the first device, or one or more time stamps generated by the first device, and the second data comprises at least one of: a MAC address of the second device, a serial number of the second device, an IP address of the second device, one or more random numbers generated by the second device, or one or more time stamps generated by the second device.

4. The method according to claim 1, wherein the first data is included in a vendor payload of the first request, and the second data is included in a vendor payload of the second request.

5. The method according to claim 1, wherein the mapping information stored at the second device correlates the seed PPK identifiers to the plurality of seed PPKs, and the second device looks up the first seed PPK from the mapping information stored at the second device using the first seed PPK identifier received from the first device.

6. The method according to claim 2, further comprising: receiving, by the first device, the mapping information from an administrator device.

7. The method according to claim 2, wherein the derived PPK is used for key material calculation relating to the IKEv2 protocol.

8. A first device comprising:

a memory;

at least one processor; and a non-transitory storage medium storing instructions executable on the at least one processor to:

select a first seed post-quantum pre-shared key (PPK) from among a plurality of seed PPKs in mapping information stored in the memory, the mapping information correlating seed PPK identifiers to the plurality of seed PPKs;

send a first request including first data generated by the first device to a second device;

receive a first response including second data generated by the second device from the second device;

derive a PPK based on the first data, the second data and the first seed PPK;

send a second request including a first seed PPK identifier of the first seed PPK from the first device to the second device to enable the second device to determine the derived PPK, the first seed PPK identifier included in the mapping information;

receive, at the first device from the second device, a second response including a confirmation of the second request from the second device, the confirmation sent by the second device after the second device has generated the derived PPK using the first seed PPK retrieved based on the first seed PPK identifier from mapping information stored at the second device; and use, at the first device, the derived PPK in an authentication of the first device.

9. The first device according to claim 8, wherein the first request and the first response are IKE_SA_INIT exchange messages according to an internet key exchange version 2 (IKEv2) protocol, and the second request and the second response are IKE_AUTH exchange messages according to the IKEv2 protocol.

10. The first device according to claim 8, wherein:

the first data comprises at least one of: a media access control (MAC) address of the first device, a serial number of the first device, an internet protocol (IP) address of the first device, one or more random numbers generated by the first device, or one or more time stamps generated by the first device, and the second data comprises at least one of: a MAC address of the second device, a serial number of the second device, an IP address of the second device, one or more random numbers generated by the second device, or one or more time stamps generated by the second device.

11. The first device according to claim 8, wherein the first data is included in a vendor payload of the first request, and the second data is included in a vendor payload of the second request.

12. The first device according to claim 8, wherein the mapping information stored at the second device correlates the seed PPK identifiers to the plurality of seed PPKs.

13. The first device according to claim 12, wherein the instructions are executable on the at least one processor to:

receiving the mapping information from an administrator device.

14. The first device according to claim 9, wherein the derived PPK is used for key material calculation related to the IKEv2 protocol.

15. A non-transitory computer-readable medium comprising instructions that when executed cause a first device to:

select a first seed post-quantum pre-shared key (PPK) from among a plurality of seed PPKs in mapping information stored in a memory of the first device, the mapping information correlating seed PPK identifiers to the plurality of seed PPKs;

send a first request including first data generated by the first device to a second device, wherein the first data comprises at least one of: a media access control (MAC) address of the first device, a serial number of the first device, an internet protocol (IP) address of the first device, a random number generated by the first device, or a time stamp generated by the first device;

receive a first response including second data generated by the second device from the second device, wherein the second data comprises at least one of: a MAC address of the second device, a serial number of the second device, an IP address of the second device, a random number generated by the second device, or a time stamp generated by the second device;

derive a PPK based on the first data, the second data and the first seed PPK;

send a second request including a first seed PPK identifier of the first seed PPK from the first device to the second device to enable the second device to determine the derived PPK, the first seed PPK identifier included in the mapping information;

receive, at the first device from the second device, a second response including a confirmation of the second request, the confirmation sent by the second device after the second device has generated the derived PPK using the first seed PPK retrieved based on the first seed PPK identifier from mapping information stored at the second device; and use, at the first device, the derived PPK in an authentication of the first device.

16. The non-transitory computer-readable medium according to claim 15, wherein the instructions when executed cause the first device to:

receive the mapping information from an administrator device.

17. The non-transitory computer-readable medium according to claim 15, wherein the first request and the first response are IKE_SA_INIT exchange messages according to an internet key exchange version 2 (IKEv2) protocol, and the second request and the second response are IKE_AUTH exchange messages according to the IKEv2 protocol.

18. The non-transitory computer-readable medium according to claim 16, wherein the derived PPK is used for key material calculation relating to the IKEv2 protocol.

\* \* \* \* \*